UNITED STATES PATENT OFFICE.

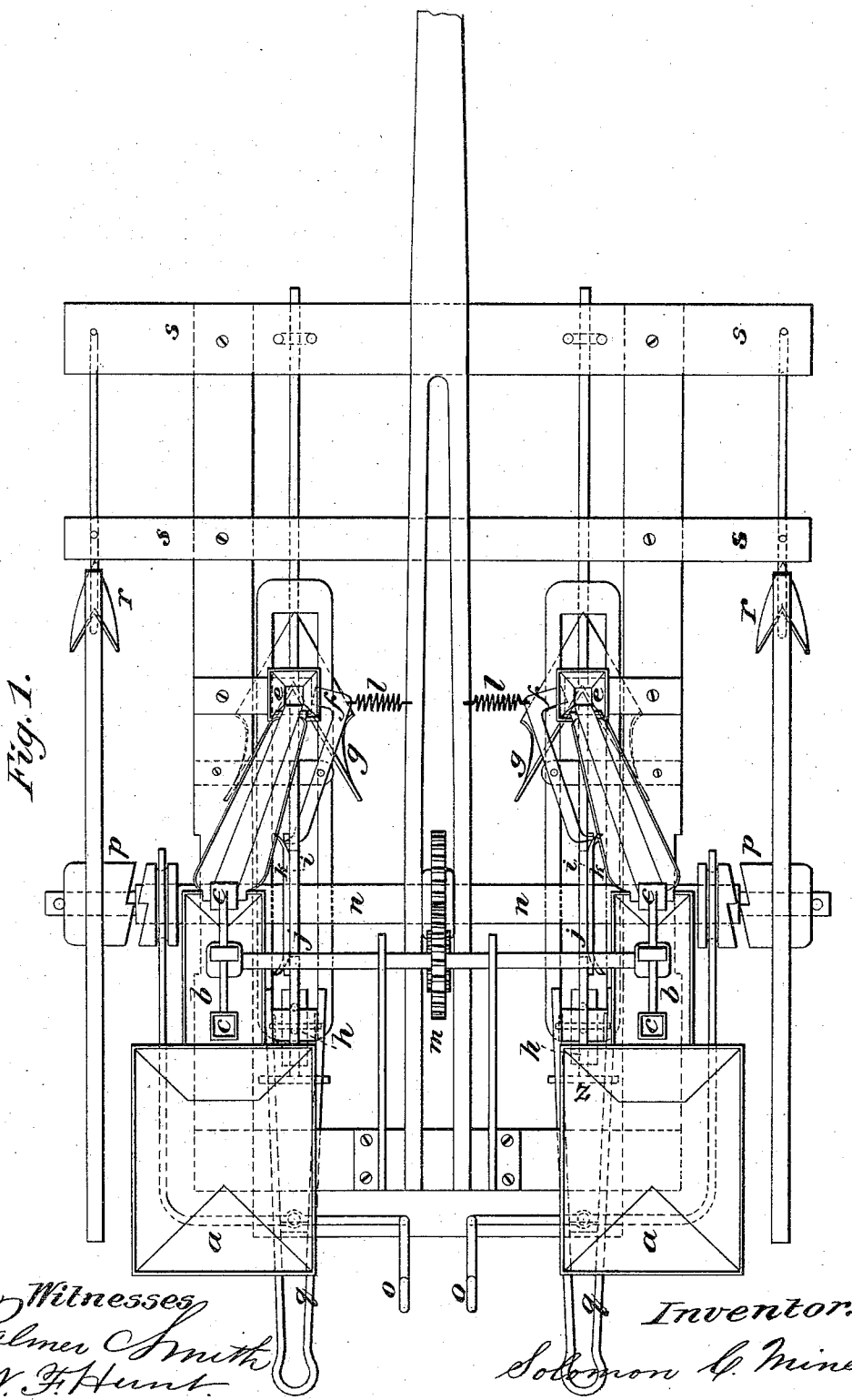

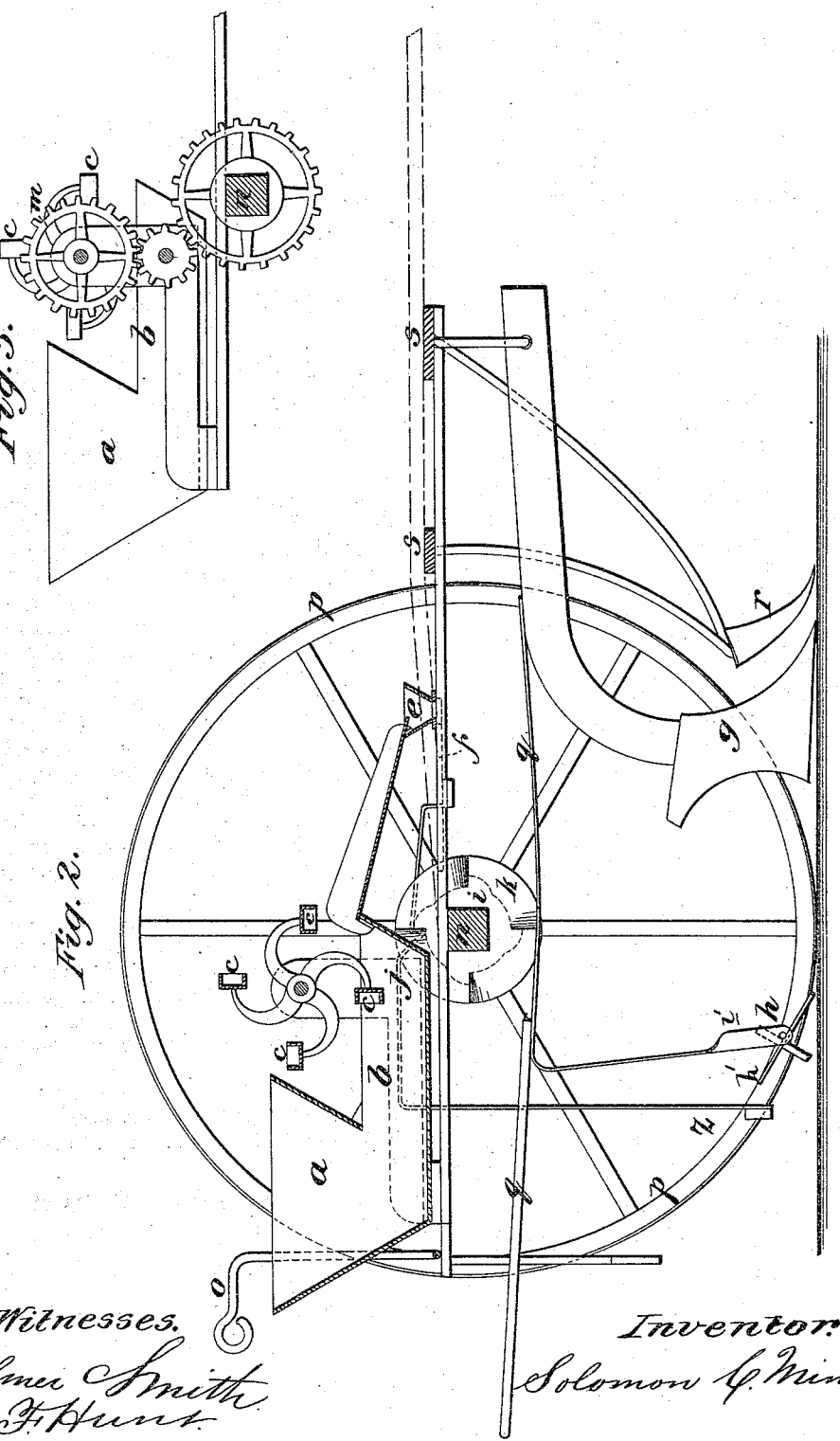

SOLOMON C. MINEAR, OF YELLOW BUD, OHIO.

IMPROVEMENT IN CORN-PLANTERS.

Specification forming part of Letters Patent No. 157,859, dated December 15, 1874; application filed December 19, 1873.

*To all whom it may concern:*

Be it known that I, SOLOMON C. MINEAR, of Yellow Bud, Ross county, and State of Ohio, have invented a Corn-Planter, of which the following is a specification:

The object of my invention is to enable a single person, with one pair of horses, or with one horse, to plant, by furrowing, dropping, and covering, two rows of corn in hills at the same time, and in such a manner that the rows will run both ways without any previous marking. The plows and dropping hoppers being adjusted three feet six inches apart, the seed-corn is placed in the hoppers and is dropped in the direction traveled by the machine, by a combination of slides, springs, wheels, and revolving cups in connection with the running-gears of said corn-planter, which enables said machine to drop and cover two hills of corn.

Figure 1 is a plan view of my improved corn-planter. Fig. 2 is a side elevation, and Fig. 3 is a section, of the same.

The machine is illustrated more in detail in the plan view, Fig. 1. The seed-corn is placed in the hoppers $a$ $a$, from which it flows into the feed-troughs $b$ $b$, and from which the revolving cups $c$ $c$ dip up the seed-corn and carry it to the feed-hoppers $e$ $e$, from which feed-hoppers, by the moving of the slides $f f$, the seed-corn is dropped as the machine travels, thus planting the corn in rows both ways. The corn is dropped in furrows made by double mold-board plows $g$ $g$, and is covered by the revolving coverers $h$ $h$, which are worked by the wheels $i$ $i$, on which there is an elevating-knob which lifts the springs $j j$ as the machine moves forward, and thus enables the coverers $h$ $h$ to make one revolution, and, by such revolution, to cover the corn thus dropped. An oscillating movement is given to the levers $f f$ by means of the cam-wheels $k$ $k$ and spring $l$ $l$, by means of which the bottom of the delivering hopper is opened and closed at proper intervals, so as to drop the grain at proper distances, &c. The revolving cups $c$ $c$ are worked by means of the cog-wheel $m$, and lift the seed-corn from the feed-troughs $b$ $b$ and empty it into the feed-hoppers $e$ $e$. Said cups are so gaged in length as to empty one cup when said machine has moved forward a suitable distance. The whole machine is worked by the revolving of the axle $n$, which is thrown in and out of gear at the will of the driver by raising or lowering the handles $o$ $o$, which work a knee on the under side of the axle $n$ and thus throw a clutch in and out of gear with the hub of the bearing-wheels $p$ $p$, and the axle $n$ is made to revolve with the wheels $p$ $p$ and thus turn the wheels $i$ $i$, $k$ $k$, and $m$, by that means alone working the whole machinery. The plow-beams $q$ $q$, to which are attached the coverers $h$ $h$, extend back behind the machine and form handles by which the plows $g$ $g$ and coverers $h$ $h$ can be raised or lowered. The shovel-plows $r$ $r$ are attached to the cross-bars $s$ $s$ and immediately in front of the wheels $p$ $p$, and make a smooth and regular track or furrow, in which said wheels $p p$ follow or travel, thus avoiding jarring or irregular motion.

What I claim as new, and desire to secure by Letters Patent, is—

In a corn-planter, the combination of the cam-wheel $k$, the spring-stop $z$, and revolving coverer $h$, substantially as and for the purposes set forth.

SOLOMON C. MINEAR.

Witnesses:
PALMER SMITH,
F. H. HUNT.